L. CASALE.
CATALYTIC APPARATUS FOR THE SYNTHESIS OF AMMONIA.
APPLICATION FILED OCT. 7, 1920.
1,408,987.
Patented Mar. 7, 1922.
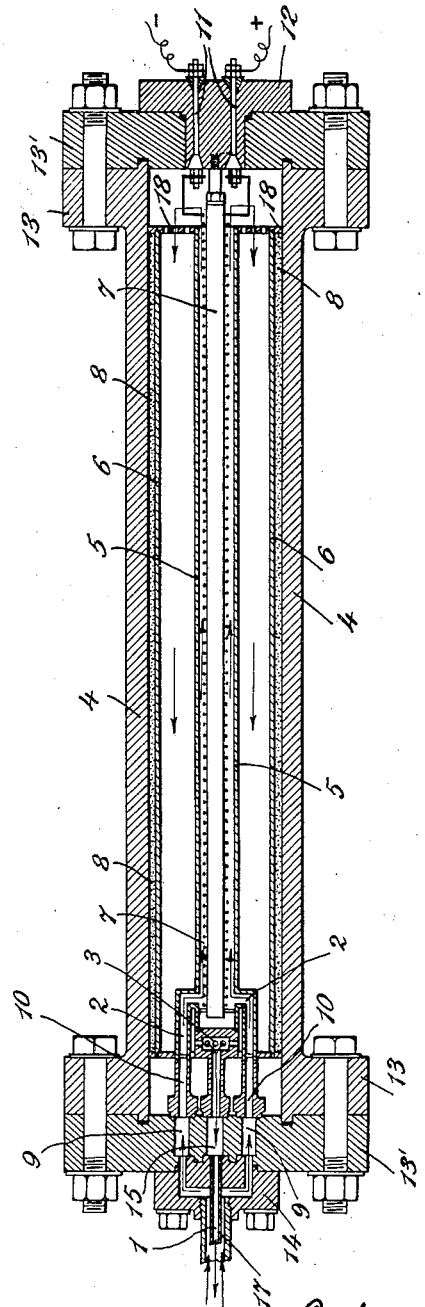

UNITED STATES PATENT OFFICE.

LUIGI CASALE, OF ROME, ITALY, ASSIGNOR TO HIMSELF AND RÉNÉ LEPRESTRE, OF NEW YORK, N. Y.

CATALYTIC APPARATUS FOR THE SYNTHESIS OF AMMONIA.

1,408,987.   Specification of Letters Patent.   Patented Mar. 7, 1922.

Application filed October 7, 1920. Serial No. 415,396.

*To all whom it may concern:*

Be it known that I, LUIGI CASALE, a subject of the King of Italy, and resident at Rome, Italy, (whose post-office address is No. 9 Via del Parlamento,) have invented certain new and useful Improvements in Catalytic Apparatus for the Synthesis of Ammonia, of which the following is a specification.

It is known that to effect the synthesis of ammonia, a mixture of nitrogen and hydrogen in theoretical proportions of three volumes of hydrogen and one volume of nitrogen is made to pass through a tube containing a catalytic substance heated to a temperature of from 400 to 600 degrees (cent.).

As is seen from the equilibrium equation—

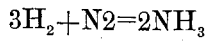
$$3H_2 + N_2 = 2NH_3$$

The percentage of mixture which combines to form ammonia by contact with the catalytic substance increases with the increase of pressure, and therefore the synthesis is usually made at a very high pressure, from 100 to 1000 atmospheres.

However at the high pressure of catalysis, only part of the gaseous mixture is combined and consequently it is advisable, after the ammonia formed has been removed, to cause the hydrogen and nitrogen not combined, to pass again over the same catalytic mass, in order that a new quantity of them may be combined. That is to say a circulation of gas is established during which the ammonia formed is eliminated (for example by means of cooling the gaseous mass) and the losses due to combination are replaced with always new quantities of nitrogen-hydrogen mixture, so that the pressure in the circuit shall not diminish. It is of interest to note that the amount of ammonia obtained per hour is also proportionate to the volume of the catalytic substance.

An apparatus of the most simple and most practical type now existing consists of an external tube with thick walls, intended to withstand the pressure of the gases and of an internal tube with thin walls intended to contain the catalytic substance. Around the internal tube, that is to say between the two tubes, aforesaid, is placed a resistance spiral which serves for heating. The cold gaseous mixture passes first into a heat recovering apparatus, in which it becomes heated at the expense of the hot gas issuing from the catalytic tube, passes then between the heating spiral and the tube containing the catalytic substance, and having thus attained the temperature of catalysis, it passes along the catalytic space.

The proximity of the heating spiral to the pressure-withstanding tube presents however a serious drawback. A part of the heat energy produced by the spiral is communicated directly to the external tube, maintaining it at a high temperature, and it is known that the hydrogen under pressure at a temperature of over 400° C. deteriorates all common steel, rapidly diminishing its power of resistance, and renders it unserviceable. Considering the high cost of these tubes, which generally weigh several tons, this entails a considerable economic loss. Furthermore it may constitute a menace to the safety of the workmen detailed to the work.

To obviate these drawbacks and to simplify the operations involved in the catalysis, I have devised a new apparatus, the subject of this application which, as will be seen from the accompanying drawing consists of the following principal parts:

I. An external tube 4 with thick walls, closed at the ends by strong plates 13, 13' the whole of special steel and intended to withstand the pressure of the gases.

II. Two concentric iron tubes 5, 6 having thin walls, inside of the tube 4, and so joined as to form a hollow annular tube intended to contain the catalytic substance in the annular space and the heating device, shown at a resistance 7 in the internal cylindrical space.

The annular tube is covered on the outside with a heat insulating material 8, partially shown in the drawing.

III. A special arrangement in one end of the apparatus shown, in I, 17 with the passages of entrance 9, 10, 2 and of exit 3, 15 of the gases.

The heat recovery apparatus, of which the drawing shows only one end, consists of two concentric tubes, one internal with thin walls and one external with thick walls. The mixture of gases arrives in the catalytic apparatus through the annular space between tubes 1 and 17, and leaves it flowing in the opposite direction through the internal tube 1. In this manner the cold gases passing through the heat recovery apparatus before entering the catalytic apparatus, become heated at the expense of the heat transmitted through the thin walls of tube 1, by the outgoing hot gases.

IV. In the central part of plate 13′ is a steel stopper 12, upon which is screwed the tube supporting the heating resistance spiral 7, and through which pass the insulated conductors 11 of electrical energy.

The gases flowing from the external passage of the heat recovery apparatus 17, through 9, 10 and 2, arrive at the central cavity containing the heat resistance; pass along the heat resistance, through perforated plate 18 and then through the catalytic subtance, thence through the holes in space 3 of the drawing, they return by way 15, to the internal passage 1 of the heat recovery.

The gaseous mixture partially transformed into ammonia while passing through the catalytic mass becomes cooled in flowing through the heat recovery apparatus and enters at last into cooling apparatuses where ammonia is condensed in a liquid state and as such eliminated from the circulation hydrogen and nitrogen not combined are sent back into the external passage of the heat recovery apparatus and then into the catalytic apparatus with a new mixture equal to the one already transformed into ammonia.

This apparatus has three essential characteristics: The heating of the catalytic mass from the center of the apparatus. This arrangement offers several advantages: first of all it affords a better utilization of the heat generated by the electrical resistance, the heat acting without dispersion directly upon the gases and upon the catalytic substance through which the gases will have to pass.

But the most important feature is that by this arrangement the external tube intended to withstand pressure, is subjected to a very indirect heating through the catalytic mass and through the stratum 8 of thermic insulation, so that its temperature will always remain far below that at which the compressed hydrogen would deteriorate the steel and render it unserviceable. Moreover this arrangement permits the utilization of a maximum capacity of the pressure-resisting tube as space for catalyzer, since for obvious geometrical reasons it is easier to diminish the space occupied by the electrical resistance, when this is placed on the inside of the catalytic mass, than it would be if the electrical resistance were placed on the outside of the tube containing the catalyst, between it and the external pressure-withstanding tube.

Lastly is the advantage of the ease with which the resistance attached to stopper in plate 12, as described in paragraph IV, can if necessary, be taken out and changed.

The arrangement as set forth in paragraph III for the entrance and exit of gases at the same end of the catalytic tube, and which by joining the heat recuperator with the entrance and exit passages of the gases through plate 13, permits the gases, issuing from the catalytic space and which are therefore very hot, to flow through the internal passage of the heat recuperator, so that its tube will not be subjected to pressure inasmuch as the pressure from the incoming gases on the outside will counterbalance the pressure of the issuing gases on the inside. This is a considerable advantage considering that hydrogen at the high temperature of catalysis would deteriorate the steel of the tubes diminishing their power of resistance.

The independence of the tube containing the catalyst both from the pressure-withstanding tube and from the resistance, which facilitates the work incidental to the change of the catalytic mass.

What I claim is:

1. In an apparatus for the synthesis of ammonia, a pressure sustaining tube, means dividing said tube into an annular catalyst chamber and a cylindrical heater chamber, a heating device and means supporting said heating device in an annular gas passage in said heater chamber.

2. In an apparatus for the synthesis of ammonia, a pressure sustaining tube, a catalyst container in said tube, a heating device surrounded by said container and supporting means for said heating device independent of said container adapted to support said heating device free of the catalyst.

3. In an apparatus for the synthesis of ammonia, a pressure sustaining tube having an annular catalyst chamber and a central heater chamber, a heating device in said heater chamber, a closure cap for said tube covering both of said chambers and a plug in said cap carrying said heating device.

4. In an apparatus for the synthesis of ammonia, a pressure sustaining tube having a catalyst chamber and a heater chamber, a closure cap for said tube, a heating device in said heater chamber and a support for said heating device carried by said closure cap and projecting into said heater chamber.

5. In an apparatus for the synthesis of ammonia, a pressure sustaining tube, a receptacle in said tube to receive the catalyst having a heater chamber within said catalyst chamber in communication with said catalyst chamber.

6. In an apparatus for the synthesis of ammonia, a pressure sustaining tube, a receptacle in said tube providing an annular catalyst chamber and a cylindrical inner chamber for the heating device, said receptacle having openings establishing communication between the chambers.

7. In an apparatus for the synthesis of ammonia, a pressure sustaining tube, closure caps for said tube adapted to provide gas inlet and outlet passages and supporting means for a gas heating device.

8. In an apparatus for the synthesis of ammonia, a pressure sustaining tube, closure caps for each end of said tube, a gas inlet in one of said caps and a heating device carried by the other of said caps.

9. In an apparatus for the synthesis of ammonia, a pressure sustaining tube, closures for said tube, a heating device and a catalyst in said tube, said heating device and catalyst being arranged for removal from said tube independently of each other.

10. In an apparatus for the synthesis of ammonia, a pressure sustaining tube having a catalyst chamber and a heater chamber surrounded by said catalyst chamber and a heating device in said heater chamber.

11. In an apparatus for the synthesis of ammonia, a pressure sustaining tube having an annular catalyst chamber and a heater chamber surrounded by said catalyst chamber and a heating device in said heater chamber adapted to be withdrawn from said tube independently of the catalyst.

12. In an apparatus for the synthesis of ammonia, a pressure sustaining tube, means dividing said tube into catalyst and heater chambers, a heating device for said heater chamber and means supporting said heating device independently of said dividing means.

13. In an apparatus for the synthesis of ammonia, a pressure sustaining tube, means dividing said tube into catalyst and heater chambers, a heating device in said heater chamber and means for withdrawing said dividing means independently of said heater element.

14. In an apparatus for the synthesis of ammonia, a plurality of spaced concentric tubes, a catalyst interposed between two of said tubes, an insulation between a pair of said tubes and a heating device within but spaced from said tubes.

15. In an apparatus for the synthesis of ammonia, a longitudinally disposed heating device, a plurality of spaced concentric tubes surrounding said device, the heating device being within an inner tube and a catalyst in a tube surrounding said inner tube.

16. An apparatus for the synthesis of ammonia from its elements, in which a heating device and tube containing a catalytic material are completely separate from each other and from an external pressure-withstanding tube.

17. In an apparatus for the synthesis of ammonia, a pressure sustaining tube, a plurality of tubes dividing said pressure sustaining tube into a catalyst chamber and a heater chamber surrounded by said catalyst chamber and a heating device in the heater chamber.

18. In an apparatus for the synthesis of ammonia, a plurality of spaced concentric tubes, heat insulating means between two of said tubes, a catalyst interposed between two of said tubes and a heating device surrounded by but spaced from said catalyst and said heat insulating means.

19. In an apparatus for the synthesis of ammonia, a pressure sustaining tube, closures for said tube, means forming catalyst and heater chambers in said pressure sustaining tube, separate inlet and exhaust passages in one of said closures connected to said chamber and a heating device in said heater chamber carried by the other of said closures.

In testimony whereof I have hereunto signed my name in the presence of two witnesses.

LUIGI CASALE.

Witnesses:
Duilio Narden,
Guiseppe Mortale.